United States Patent [19]

Rosinnes et al.

[11] Patent Number: 4,841,218
[45] Date of Patent: Jun. 20, 1989

[54] ELECTRONIC CONTROLLER AND A SYSTEM AND METHOD FOR OPTIMIZING GENERATION OF ELECTRICAL POWER UTILIZING THE SAME

[75] Inventors: Meir Rosinnes, Ra'Anana, Israel; Hugo Stadler, Ruhstorf/Rott; Siegfried Strunz, Pocking, both of Fed. Rep. of Germany

[73] Assignees: Amin Engineers Ltd., Israel; Loher Aktiengesellschaft, Fed. Rep. of Germany

[21] Appl. No.: 150,377

[22] Filed: Jan. 29, 1988

[30] Foreign Application Priority Data

Jan. 30, 1987 [IL] Israel ................................. 81437

[51] Int. Cl.⁴ ............................................. H02P 9/00
[52] U.S. Cl. ........................................ 322/24; 322/18; 322/28; 322/32; 363/8
[58] Field of Search ............ 363/8, 16, 35, 37, 85-88, 363/159-161, 164, 165; 318/763, 764; 322/17, 18, 21-25, 28, 32, 35

[56] References Cited

U.S. PATENT DOCUMENTS

| | | | |
|---|---|---|---|
| 3,991,359 | 11/1976 | Thompson et al. | 363/85 |
| 4,219,768 | 8/1980 | Gobaud | 322/98 |
| 4,371,828 | 2/1983 | Tornotore et al. | 322/32 |
| 4,525,633 | 6/1985 | Wertheim et al. | 322/35 |
| 4,656,413 | 4/1987 | Bourbeau | 322/19 |

*Primary Examiner*—Peter S. Wong
*Attorney, Agent, or Firm*—Darby & Darby

[57] ABSTRACT

In a system comprising an asynchronous generator rotatable at variable speeds, and a main electrical network carrying power at a substantially constant voltage and frequency, the improvement comprising a synchronizer having an electronic optimization controller connected in circuit between the generator and the network, the synchronizer being capable of receiving electrical power at variable voltages and frequencies from the generator and controllably and continuously injecting the power into the network at substantially constant voltage and frequency. A method for optimizing the generation of electrical power into the mains is also claimed.

8 Claims, 4 Drawing Sheets

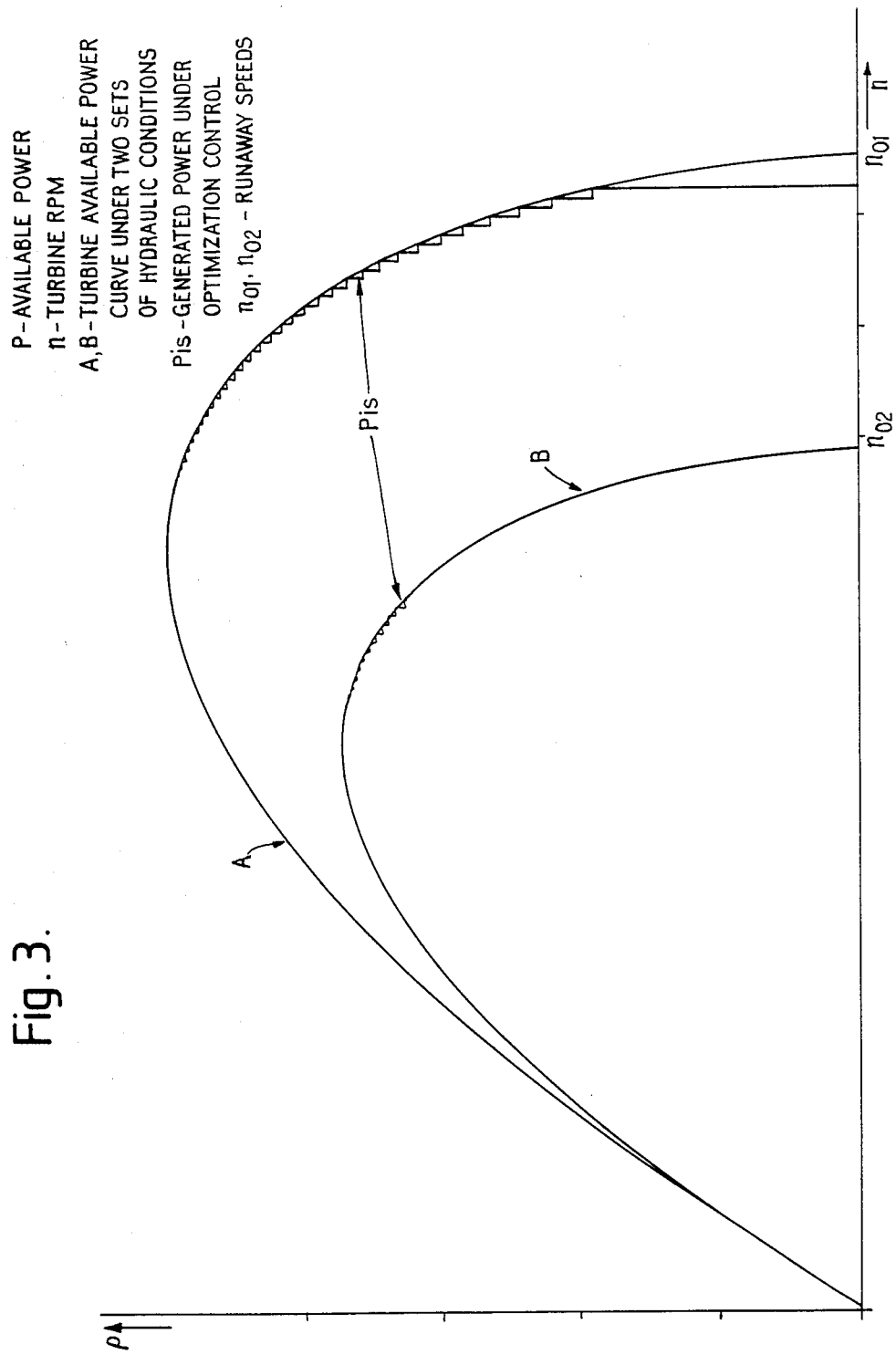

ELECTRONIC CONTROLLER AND A SYSTEM AND METHOD FOR OPTIMIZING GENERATION OF ELECTRICAL POWER UTILIZING THE SAME

BACKGROUND OF THE INVENTION

The present invention relates to a system and a method for optimizing the generation of electrical power into electrical power mains. The present invention also concerns an electronic optimization controller for optimizing power generation into the mains by a synchronizer.

A synchronizer is a device which enables the controlled generation or injection of electrical power from an asynchronous generator, rotating at variable speeds, into a main network which has a predetermined fixed voltage and frequency.

In essence a synchronizer is a modification of a four-quadrants current link frequency converter. It is known that current link frequency converters which drive motors with large inertia loads (such as centrifuges) at variable speed, are used to brake these motors by a passive, uncontrolled regenerative braking action, by loading the motor and feeding the resulting generated power to the net until the motor is braked. The modification enables the synchronizer to be used for new applications and is installed between the main electric network and the asynchronous generator. The synchronizer enables recovery of energy from systems out of which energy could not be readily or economically recovered before, and also greatly improves the performance of conventional energy recovery systems.

In industrial plants, water works and the like, situations may arise where fluids with excessive energy, i.e., excessive pressures and velocities, are available. This surplus of energy may be converted into electrical energy, and be used. If this excessive energy is not collected and used, it will usually be throttled by valves, by-passed or dissipated by other means, and be wasted.

Typical examples where such excessive available energy could be advantageously utilized are:

Reinjection, in winter time, of surplus water back into the ground to replenish the underground water tables; branching off oil or water lines from high pressure main lines into low pressure zones of local users areas; bleeding off product or crude oil from high pressure point in a line to storage; reverse osmosis rejected brine; windmills, and exploitation of the head of water sources in hilly terrain.

The universal and most economic way to recover such energies is to drive a generator by a fluid turbine and to inject the generated electrical energy into the main elecric network. One of the most economical and simplest generators is an asynchronous motor, driven at over-synchronous speeds, and this invention is mainly directed to this type of generator. The turbine may be of the Pelton or Francis wheel type, however, the most economic and simplest turbine is a fixed vanes centrifugal turbine, which is, in essence, a reversible pump running as a turbine. This centrifugal turbine is especially convenient when using dual purpose units, i.e., units that operate both as motor driven pumps for part of the time, adn then as turbine driven generators for the rest of the time. When fluid pressure is reversed, the pump becomes a turbine and the motor becomes an asynchronous generator.

Since the main network is a "rigid" system, i.e., a system having a fixed frequency and voltage, the output of the asynchronous generator is to be regulated in such a way that its rotational speed values are kept within close tolerances in the vincinity of its synchronous speed, corresponding to the main network and slightly above it.

If these tolerances are not kept, two things may happen:
1. The asynchronous generator will "over-run" the mains, and will break away out of synchronization; and
2. The asynchronous generator will "drag" or "fall back" realtive to the net, and will then be driven by the net operating as a motor and consume energy, instead of generating energy and feeding it into the net.

Due tot he above reasons, in this kind of an installation two main aspects are to be considered: (a) how to enable continuous running of the system under varying turbine conditions without breaking out of synchronization; and (b) how to maintain good system efficiency under varying turbine conditions.

Regarding thd first aspect, since the generator is directly connected to the main grid or network, this main network is imposing a constant speed on the turbine-generator system, however, contrary to this, the fluid conditions may very over a wide range. In order for the system not to "break-away", from, or to "drag behind" the main grid, in spite, and irrespective of varying hydraulic conditions of the fluid which drives the turbine, one of two solutions is usually used:

1. When using uncontrollable turbines, such as reversed pumps, a control system is necessary between the source of the fluid and the inlet of the turbine in order to keep the turbine conditions within the required tolerances. This sytem is adapted to throttle or by-pass (and therefore waste) excessive fluid flows and pressures, in case fluid conditions are too "high", in order to maintain the imposed fixed speed or, to disconnect the generator from the mains in case fluid conditions are too "low" to maintain this fixed, imposed speed, thereby by-passing and wasting the fluid energy which is available. Such control systems are inefficient, as they must dissipate or relieve fluid pressures and flows that could otherwise be used for energy generation.

It also has to be taken into consideration that at fixed, imposed speed, and reduced fluid pressures and flows, the efficiency of fixed vanes centrifugal turbines and reversed pump falls extremely rapidly, until it falls below zero (consumption of energy) and the system has to be disconnected from the mains.

In some cases, like wind turbines, it is altogether impractical to install a regulation control system on the driving fluid. As a result, alternating current cannot be effectively used and hence, direct current systems are instead installed, or alternatively, a complex vane angle changing control mechanism is to be used.

2. When using controllable turbines such as a Pelton Wheel turbine with adjustable nozzles, or a Francis turbine with adjustable vanes, the turbine can be controlled over a certain range of fluid conditions, however, again, the system still has to be disconnected when fluid conditions are not sufficient to maintain the fixed speed and fluid has to be by-passed in case fluid conditions are too "high". These kind of turbines are costly to maintain due to sealing problems at the adjustable vane control rods, which rods can only operate reliably with clean fluids.

SUMMARY OF THE INVENTION

In contradistinction to the above described prior art energy generating systems, the present invention proposes a more efficient method and apparatus for generating electrical power into the mains in accordance with the following principle of operation:

Instead of connecting an asynchronous generator directly to the main network, thereby locking the system onto a fixed speed, the synchronizer is placed between the asynchronous generator and the main net. The synchronizer feeds the power into the net with constant frequency and voltage, but with varying current, however, induces controlled variable frequency and voltage into the generator, thereby governing the rotational speed of the generator-turbine assembly to virtually any desired rotational speed, according to any desired control algorithm and parameters.

The main network, therefore always sees proper and constant frequency and voltage necessary for energy injection from the synchronizer into the net, irrespective of the rotational speed of the turbine-generator assembly. The generator, on the other hand, sees variable frequency and voltage causing it to rotate at a varying speed, the magnitued of which is dictated by the control system of the synchronizer.

When the desired control algorithm is an optimization for achieving maximum power possible, the system will operate as follows:

At any given fluid conditions (available pressure and flow) there is only one speed, between zero rpm and runout rpm at which the power generation will be maximal. The control system will identify this point and will cause the generator-turbine system to rotate at this optimal rpm, and thus to generate the maximum possible energy, and will inject this energy into the net. As fluid conditions change, the control system will identify the new optimal rpm value, and will cause the generating assembly to change speed until it rotates at this optimal rpm.

The result is that turbine conditions can continuously vary without restriction from very low values up to very high values, and the system will consequently change its rotational speed to the optimum value, so that energy will always be generated and at the best possible efficiency. The only restricting parameters will be the parameters of the mechanical system, such as shaft strength, maximum allowed speed, etc. and those of the electrical system, like minimum and maximum allowed currents, etc. and the control system will monitor these parameters and ensure that they are not exceeded.

Due to its inherent properties the synchronizer system of the present invention can prevent torque reversal and transit into motor mode, thereby guarding from damage mechanical systems that are sensitive to torque reversal, such as reversible pumps with screwed-on impellers or screwed couplings.

On dual purpose units, such as seasonal reinjection of surplus water into water wells and night current storing systems the synchronizer will operate during the pumping period as a frequency converter in order to regulate pump speed to the system demands, and as an energy recovery synchronizer during the generating period.

In accordance with the present invention there is therefore provided in a system comprising an asynchronous generator rotatable at variable speeds, and a main electrical network carrying power at a substantially constant voltage and frequency, the improvement comprising a synchronizer having an electronic optimization controller connected in circuit between said generator and said network, said synchronizer being capable of receiving electrical power at variable voltages and frequencies from said generator and controllably and continuously injecting said power into said network at substantially constant voltage and frequency.

The invention further provides a method for optimizing the generation of electrical power into the mains by means of a system including an asynchronous generator rotatable at variable speeds and a synchronizer having an electronic optimization controller connected between said generator and said mains, said method comprising;
(a) synchronizing the frequencies of said synchronizer to the frequency of the free-running generator;
(b) changing the frequency value of said generator to a lower or high frequency value of a predetermined period of time;
(c) determining the direction in which the rated value of the generator's frequency has to be changed for achieving maximum available power;
(d) repeating steps (b) and (c) until said maximum available power is attained, and
(e) changing the generator's frequency and thereby the generator's speed to generate power to the mains at said maximum available power.

The invention also provides an electronic optimization controller for identifying and controlling the optimal speed of operation of a generator for generating maximum electrical power output in a system including an asynchronous generator rotatable at variable speeds and a synchronizer connected between said generator and electrical power mains, said controller comprising:
sample and memory means for continuously monitoring and storing signals representative of the actual instantaneous generated output power;
a comparator for comparing an instant output power signal with a previous output power signal and providing a signal indicative of the direction and magnitude of a power output change;
a memory connected to said comparator for storing the signal indicative of the direction of the power output change and the direction of the frequency change of said generator;
a logic circuit fed by said memory for determining the direction of the frequency change to be induced in the generator resulting from the last change in the generator's power output and in the last change in the generator's frequency;
circuit means connected to said memory and responsive to a decrease of power output of the generator, which follows a previous increase of power, by emitting an output signal activating a delay circuit for keeping the generator at a constant speed for a predetermined period of time;
power change magnitude detection circuit, connected for receiving signals from said comparator and adapted to activate said logic circuit whenever the magnitude of a signal representative of the power change exceed a predetermined value, and a trigger circuit, connected to the output of said logic circuit, for triggering the synchronizer's inverter for changing the generator's speed in a direction determined by said logic circuit.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 3 is a poer versus generator's turbine RMP curves exemplifying the operation of the inventio.

DESCRIPTION OF THE PREFERRED EMBODIMENT

Figure 1:
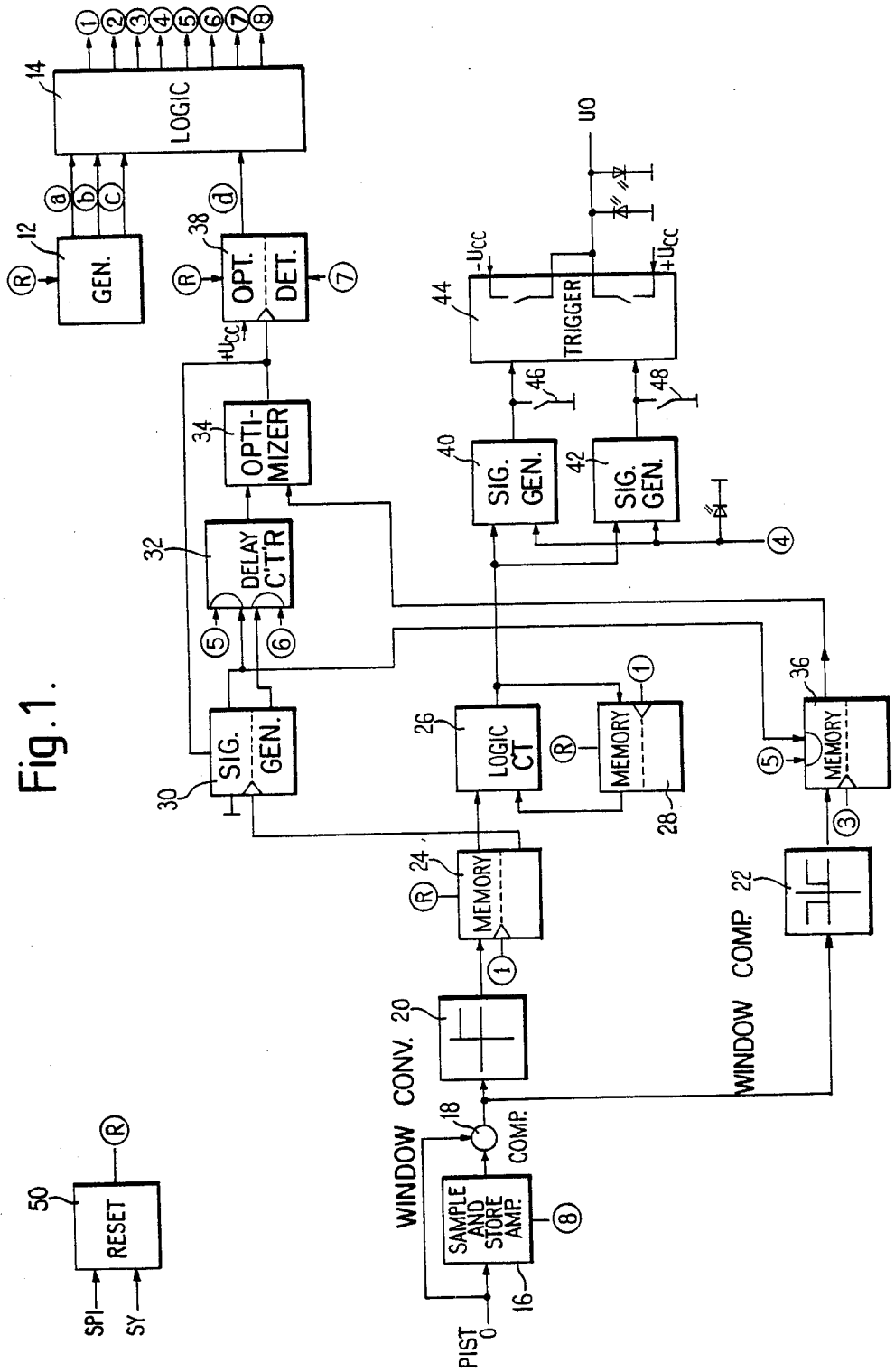
FIG. 1 is a block diagram of an electronic controller according to the present invention.

Referring to FIG. 1, there is seen a block diagram of an electronic optimization controller according to the present invention, for identifying and controlling the optimal speed of operation of a generator, for generating maximum power output in a system which includes an asynchronous generator (not shown) rotatable at variable speeds and a synchronizer (not shown) connected between the generator and electrical power mains. The controller comprises a generator 12 driving clocks a, b and c forming pulses 1 to 8 at a logic unit 14. The pulses 1 to 8 time the sequence of operations of the controller's units as indicated throughout the diagram. The controllers input terminal Pist, actual instantaneous power, leads to a sample and store amplifier 16, which stores the value of the actual generated power upon receiving an activating pulse from output terminal 8 of the logic unit 14. A comparator 18 connected to the output of the amplifier 16 receives a direct signal representing the instantaneous generated power of the generator, compares the present to previous signal and emits a signal indicative of an increase or decrease of the generated power as well as of the magnitude of the change which took place. This signal is fed to a circuit 20 designed to form a new signed indicative of the direction of the change of power which took place, namely, whether there has occurred a negative or positive change. The output of the comparator is also applied to unit 22 which determines the magnitude of the change of power, i.e., whether or not this magnitude exceeded a predetermined range. The importance and use of the information regarding the magnitude of change will be explained hereinafter. The output of circuit 20 is applied to memory 24 which stores the last sign of power change, i.e., whether the last change was negative or positive. Logic circuit 26 is designed to determine and control the direction (increase or decrease) of the next change in the generator's frequency which should be effected. This change, which will be described in greater detail further on, is determined in accordance with the following truth table characterizing the logic circuit.

| Last Change in Frequency | Last Change in Power | Next (new) Change in Frequency |
| --- | --- | --- |
| Decreased | Decreased | Increase |
| Decreased | Increased | Decrease |
| Increased | Decreased | Decrease |
| Increased | Increased | Increase |

The last sign of the speed change of the generator is applied from the output of the circuit 26 to memory 28 and stored therein. The last information relating to the change of the actual generated power, namely, whether the power has increased or decreased, stored in memory 24 is applied to the unit 30 which emits an output signal when there has been a decrease of power, which decrease is an indication that the peak power point has been reached. The emitted output signal is applied to a delay counter 32 delaying the initiation of a new optimization process for a predetermined period of time. The initiation of a new optimization process is effected by circuit 34 which receives information from both the delay counter 32, as well as from the memory 36 which stores the information from the unit 22, the latter determines the magnitude of the change of power which took place. Thus, circuit 34 will start said optimization upon reaching the end of the delay time or upon receiving a signal from memory 36 indicating that there has been a power change of a magnitude exceeding a preset value. Optimization detector unit 38, fed by the output of the circuit 34 provides the logic unit 14 via a clock d with a signal indicating whether the controller is in an optimization process or not. The output of the logic circuit 26 is simultaneously fed to circuit elements 40 and 42, for producing an output signal, when the delay counter 32 is not running, in order to perform the next change in the generator speed. The signals produced by elements 40 and 42 are transferred to trigger circuit 44 producing the signal 40 for triggering the synchronizers inverter (not shown) for changing the generator's speed in the direction determined by the logic circuit 26. Switches 46 and 48 facilitate the manual change of the generator's speed, step by step, to increase or decrease the same. Finally, the controller is provided with a reset element 50, generating a reset signals to the controllers circuits as indicated by the letter R during the synchronization process (SY signal) and when a trip of the system occurs (SPi).

Figure 2:
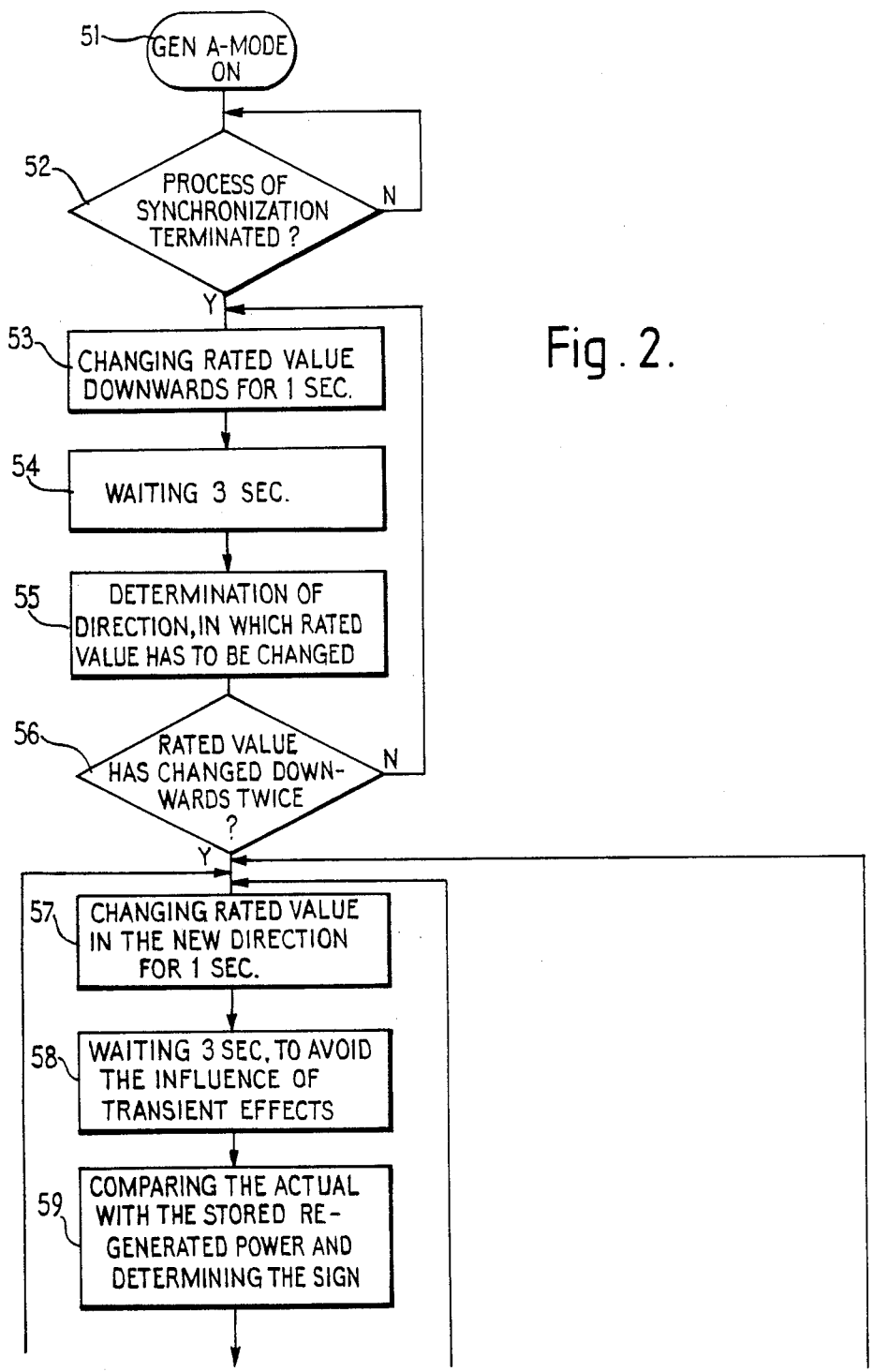
FIG. 2 is a flow diagram of the sequence of operation of the controller of FIG. 1.
Figure 2:
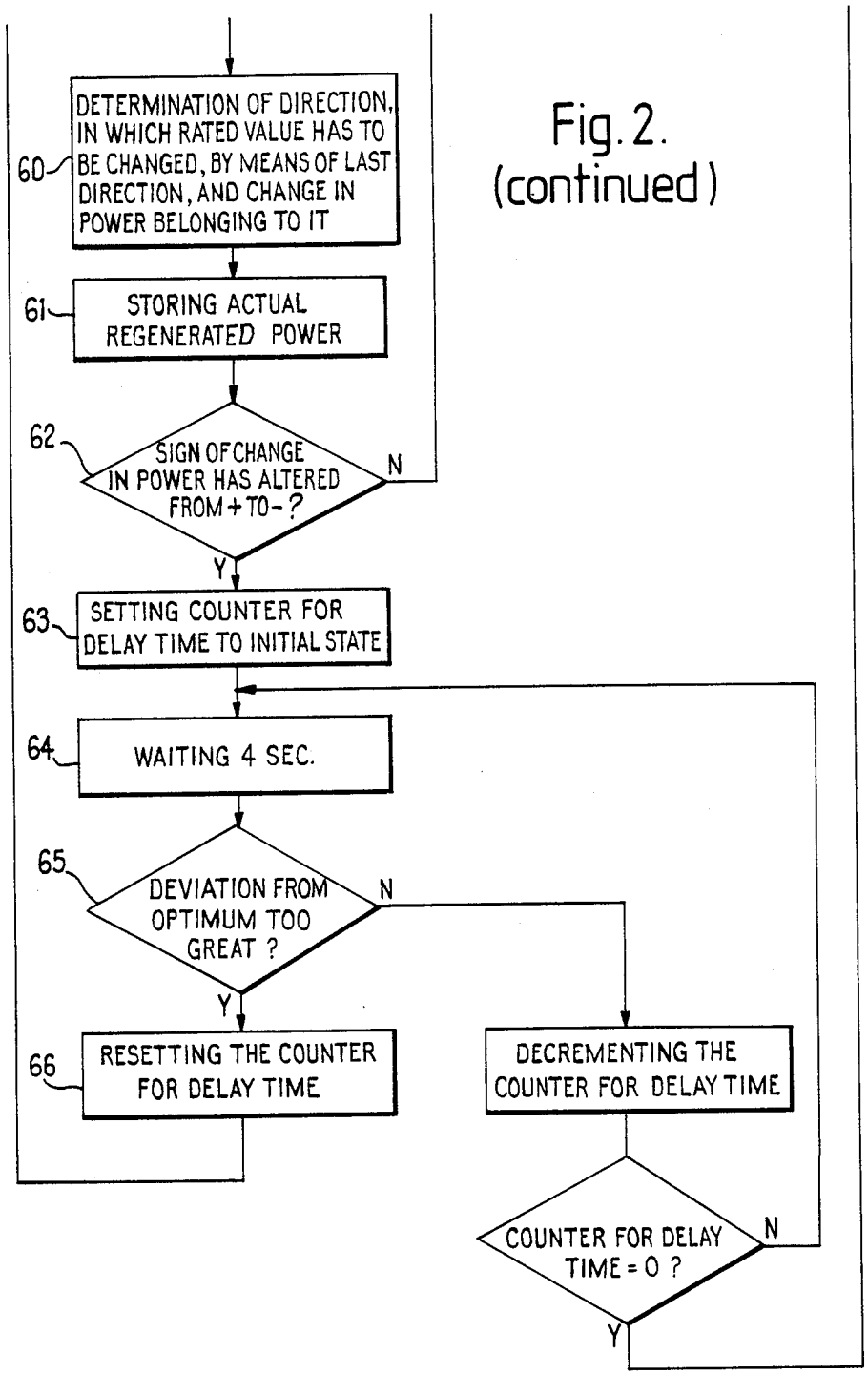

In FIG. 2 there are set forth the operational steps of the system laid out in a self-explanatory flow diagram form, each step carrying a number starting from 51 to 68.

For even better understanding, there are illustrated in FIG. 3 two typical curves A and B, each representing turbine available power curves P under a specific hydraulic condition at various turbine speeds, where $no_1$ and $no_2$ represent, respectively, the runaway speeds of the two conditios. There is also clearly seen the stepwise path of the generated instantaneous power Pis which it follows under optimization control, until it reaches the curve's peak representing the maximum available power P.

The sequence of operation of the system including the controller described hereinabove with reference to FIG. 1, will now be described also with reference to FIGS. 2 and 3.

(a) When fluid flows through the turbine, the generator, which is directly coupled to the turbine, will accelerate freely, and without load. The synchronizer, including the controller, will sense the generator's frequency and will synchronize itself to this frequency, while maintaining zero generating slip, i.e., this synchronization process will take place without loading the generator, until the generator reaches a steady state free running speed ($no_1$ or $no_2$, FIG. 3), or another pre-set speed. Each time the synchronizer is switched on, it will follow through this synchronization process (steps 51 and 52, FIG. 2). After the synchronization state is reached, and only if the generator's frequency is above a pre-set minimal adjustable value, will the synchronizer activate the generator by inducing voltage and frequency therein at a constant ratio, starting from synchronization frequency (zero slip, zero power generation). From this point, frequency is gradually decreased to start the loading of the generator.

(b) The variations of frequency from synchronization state (zero slip, zero power generation) down to the appropriate loading frequency will be performed at pre-set rate of changes (steps 53–55, FIG. 2).

(c) In case the control parameter is set at maximum generated power, the automatic control of the synchronizer will monitor the generated power and vary the frequency and voltage until the system delivers maximum generated power. As hydraulic conditions change, thereby varying the speed and/or torque on the generator's shaft, the system will automatically sense this occurrence and seek to restore a state of maximum generated power, by refinding the optimum frequency (steps 57–63, FIG. 2). If during the abovementioned control process the generator loading current should reach a pre-set maximum value, the system will stay at this point and not seek to reach maximum generated power.

When the direction of the power change varies from increasing to decreasing, this is the indication that the maximum point was reached (step 62 in FIG. 2).

At the peak power point, the system will stay at a constant speed and only periodically re-check for the maximum power e.g., every preset delay time of, for example, a few minutes. If within this delay time a big change in power, bigger than a present range, has occurred (steps 63–68, FIG. 2). The control parameter does not have to be at maximum generated power, it can be any other power level below the maximum power.

(d) If, due to hydraulic, mechanical, or other external cause, the generator current drops under a pre-selected minimum value, the synchronizer will switch off the operation, i.e., the generator will be disengaged.

(e) In cases of mains failure, or when the generator's rpm drops below the pre-set minimum value, the synchronizer will automatically deactivate the generator load. On power return or generator re-acceleration, the synchronizer will automatically follow through steps (a) (b) and (c) above with a delay action of e.g., about 30 to 90 seconds.

(f) If a non-reverse torque is specified, generator slip will be automatically maintained so as to always keep a positive slip direction. Under no conditions whatsoever will it then be possible for the system to change into the motor mode operation, namely, the slip will always stay in the generating direction. Specified by the user, the system can allow alternate operation between motor mode and generator mode, smoothly and without torque jerks.

(g) A change-over switch which is provided cancels the automatic control and enables manual speed control by the operator. Even under manual speed control, the maximum generator current limitation will prevail, i.e., the generator current will not exceed a pre-selected maximum value even when the synchronizer is in the manual speed control mode.

(h) When a selector switch is in the motor mode position, the synchronizer will perform as a frequency converter, and the system will operate as a pump-motor set at variable speeds, which speeds will be controlled according to the user's specifications.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a system comprising an asynchronous generator rotatable at variable speeds, and a main electrical network carrying power at a substantially constant voltage and frequency, the improvement comprising:
   a synchronizer having an electronic optimization controller, said synchronizer being connected in a circuit between said generator and said network for receiving electrical power at variable voltages and frequencies from said generator and for controllably and continuously injecting said power into said network at substantially constant voltage and frequency.

2. The system as claimed in claim 1 wherein said controller has means for identifying the optimal rotational speed of the generator's shaft for maximum power generation for any given maximum available power condition and for controlling the rotation of the shaft at said speed.

3. The system as claimed in claim 2 wherein said controller comprises:
   means for measuring the actual instantaneous power;
   circuit means for continuously determining the actual maximum available power, and
   circuit means for changing the generator's frequency and thereby the generator's speed to generate power to the mains at said determined maximum available power.

4. The system as claimed in claim 3 further comprising delay means for delaying the further operation of maximum power availability determination for a predetermined period of time, after each determination of the actual instantaneous power available and the changing of the generator's frequency to match the same, as well as delaying the operation after reaching the maximum power available.

5. A method for optimizing the generation of electrical power into a main electrical network, the method comprising the steps of:
   (a) synchronizing frequencies of a synchronizer to a frequency of an asynchronous generator;
   (b) changing a frequency value of said generator for a predetermined period of time;
   (c) determining a direction in which a rated value of the generator's frequency has to be changed for achieving maximum available power;

(d) repeating steps (b) and (c) until said maximum available power is attained, and (e) changing the generator's frequency and thereby the generator's speed to generate power to the main electrical network at said maximum available power.

6. The method as claimed in claim 5 further comprising the steps of:

(f) periodically checking for deviations, exceeding a predetermined range from said maximum available power, and (g) repeating steps (b) to (e) upon determination of a deviation of the available power from said predetermined range.

7. An electronic optimization controller for identifying and controlling the optimal speed of operation of a generator for generating maximum electrical power output in a system including an asynchronous generator rotatable at variable speeds and a synchronizer connected between said generator and electrical power mains, said controller comprising:

sample and memory means for continuously monitoring and storing signals representative of actual instantaneous generated output power;

a comparator for comparing an instant output power signal with a previous output power signal and providing a signal indicative of the direction and magnitude of a power output change;

a memory connected to said comparator for storing the signal indicative of the direction of the power output change and the direction of the frequency change of said generator;

a logic circuit fed by said memory for determining the direction of the frequency change to be induced in the generator resulting from the last change in the generator's power output and in the last change in the generator's frequency;

circuit means connected to said memory and responsive to a decrease of power output of the generator, which follows a previous increase of power, by emitting an output signal activating a delay circuit for keeping the generator at a constant speed for a predetermined period of time;

power change magnitude detection circuit, connected for receiving signals from said comparator and adapted to activate said logic circuit whenever the magnitude of a signal representative of the power change exceed a predetermined value, and a trigger circuit connected to the output of said logic circuit, for triggering the synchronizer's inverter for changing the generator's speed in a direction determined by said logic circuit.

8. The controller as claimed in claim 7 further comprising switching means for manually increasing or decreasing the generator's speed.

* * * * *